No. 668,356. Patented Feb. 19, 1901.
P. E. PLACET.
ELECTRICAL ACCUMULATOR BATTERY.
(Application filed Nov. 14, 1899.)
(No Model.)
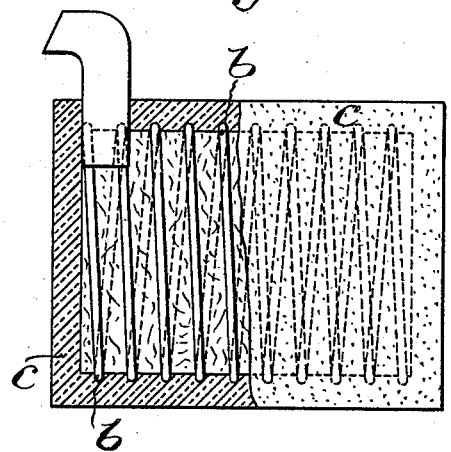
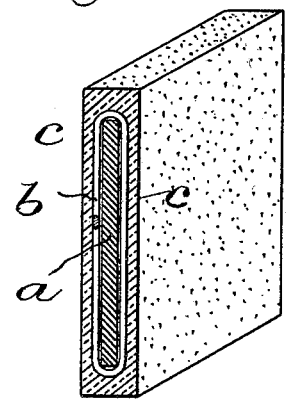

UNITED STATES PATENT OFFICE.

PAUL EMILE PLACET, OF PARIS, FRANCE.

ELECTRICAL ACCUMULATOR-BATTERY.

SPECIFICATION forming part of Letters Patent No. 668,356, dated February 19, 1901.

Application filed November 14, 1899. Serial No. 736,966. (No model.)

*To all whom it may concern:*

Be it known that I, PAUL EMILE PLACET, engineer, a citizen of the Republic of France, and a resident of 18 Rue Denfert-Rochereau, Paris, France, have invented new and useful Improvements in Electrical Accumulator-Batteries, of which the following is a specification.

My invention has for its object to obtain electrode-plates for accumulators which are both light and strong, which is always desirable, in particular when the accumulators have to be fitted on vehicles, ships, and other moving objects.

My invention consists in an electrode-plate composed of a support of fibrous material which is saturated and coated with a substance protective against the electrolyte to be used in the battery and is surrounded by a coil of wire or material conductive of electricity and is incased with a composition of gylcerin and an oxid of lead, to which composition I sometimes add in powder inert matters, which I eliminate either by dissolution or volatilization to render it porous.

The invention is illustrated in the accompanying drawings, in which—

Figure 1 represents a face view, partly in section, of an electrode embodying my invention; and Fig. 2 a perspective view showing a transverse section of the electrode.

*a* is the support, composed of a web of fibrous material—such as felt, cloth, canvas, or horsehair—soaked and coated with a protective material—such as paraffin, bitumen, caoutchouc solution, silicate, or marine glue—to protect it from attack by the acidulated water of the bath.

*b* is the coil of wire or conducting material, which closely surrounds the support *a* and with which one of the conducting-wires of the battery is to be connected.

*c* is the composition which constitutes the outer faces and body of the plate and which forms a coating to the support and its surrounding coil. It is made of a thick paste obtained by mixing glycerin with an oxid of lead—such as litharge, minium, peroxid of lead, or with a mixture of two or more of these oxids. This coating of paste dries in a few hours in the atmosphere; but its drying is expedited by keeping it between metal plates slightly heated. The plates thus formed are very strong and may be almost entirely composed of active material and are well suited either for positive or negative electrodes. It suffices to immerse them in acidulated water and to pass an electric current through them in connecting them to the negative pole in order in a very short time to effect the transformation of the whole of the composition into a very strong spongy lead, which is cohesive and very permeable.

The porosity of the plates may be increased by mixing with the lead-oxid paste powdered inert materials which after its hardening will dissolve in a liquid, such as acidulated water. As such materials may be used starch or magnesia, or materials may be employed, such as camphor or naphthalene, which will afterward volatilize.

What I claim as my invention is—

1. An accumulator-plate composed of a support of fibrous material coated with a protective substance, surrounded by coils of material conductive of electricity and incased with a composition of glycerin and an oxid of lead, substantially as herein described.

2. An accumulator-plate composed of a support of fibrous material coated with a substance that will prevent its being injured by an electrolyte and surrounded by coils of a material conductive of electricity, and an incasing composition consisting of glycerin, oxid of lead and a powder susceptible of being eliminated after the hardening of the composition, substantially as herein described.

In testimony that I claim the foregoing as my invention I have signed my name, in presence of two witnesses, this 2d day of November, 1899.

PAUL EMILE PLACET.

Witnesses:
 EDWARD P. MACLEAN,
 ALCIDE FABE.